Dec. 6, 1955  F. E. HOWDLE  2,725,972
MECHANISM FOR CONVEYING AND COUNTING FLAT, FLEXIBLE
ARTICLES DELIVERED IN A STREAM
Filed May 7, 1954  2 Sheets-Sheet 2

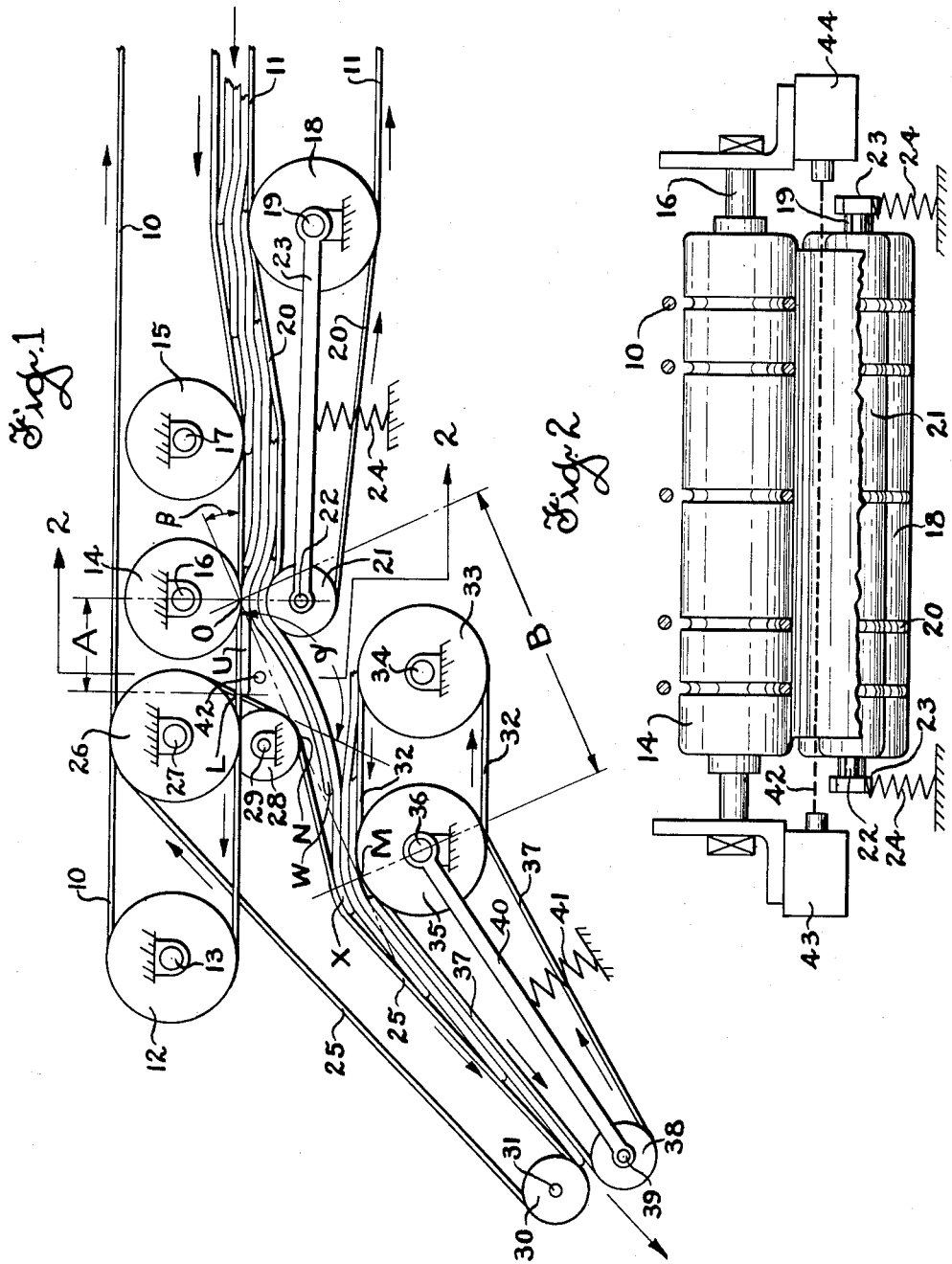

Inventor
Frederick E. Howdle
By H. R. Rather
Attorney

United States Patent Office 2,725,972
Patented Dec. 6, 1955

2,725,972

MECHANISM FOR CONVEYING AND COUNTING FLAT, FLEXIBLE ARTICLES DELIVERED IN A STREAM

Frederic E. Howdle, Milwaukee, Wis., assignor to Cutler-Hammer, Inc., Milwaukee, Wis., a corporation of Delaware Application May 7, 1954, Serial No. 428,302

5 Claims. (Cl. 198—40)

This invention relates to an improved mechanism for conveying and counting flat, flexible articles delivered in a stream.

While not limited thereto the mechanism of the present invention is particularly suited as a feed conveyor and counter mechanism for use in conjunction with a stacking mechanism disclosed and claimed in the Howdle and Otto application Serial No. 360,674, filed June 10, 1953.

It is the object of the present invention to provide an improved mechanism for conveying and counting flat, flexible articles, such as newspapers and the like, which are being delivered in a stream, either in single, spaced apart relation, or in overlapped, direct delivery relation, with folded edges forward.

Another object of the invention is to provide a mechanism of the aforementioned type wherein the leading portions of such articles are positively flipped through a light beam impinging on a photo-electric device, thereby eliminating counting errors which may occur with off-fold conditions.

A further object is to provide a mechanism of the aforementioned type which is well suited for use with double wire belt type conveyors.

Other objects and advantages of the invention will hereinafter appear.

The accompanying drawings illustrate a preferred embodiment of the invention which will now be described, it being understood that the embodiment illustrated is susceptible of various modifications in respect of details without departing from the scope of the appended claims.

In the drawings:

Figure 1 is a schematic view in side elevation of a portion of a conveyor mechanism incorporating the invention.

Fig. 2 is a view taken substantially along the line 2—2 of Fig. 1, and

Figure 3:
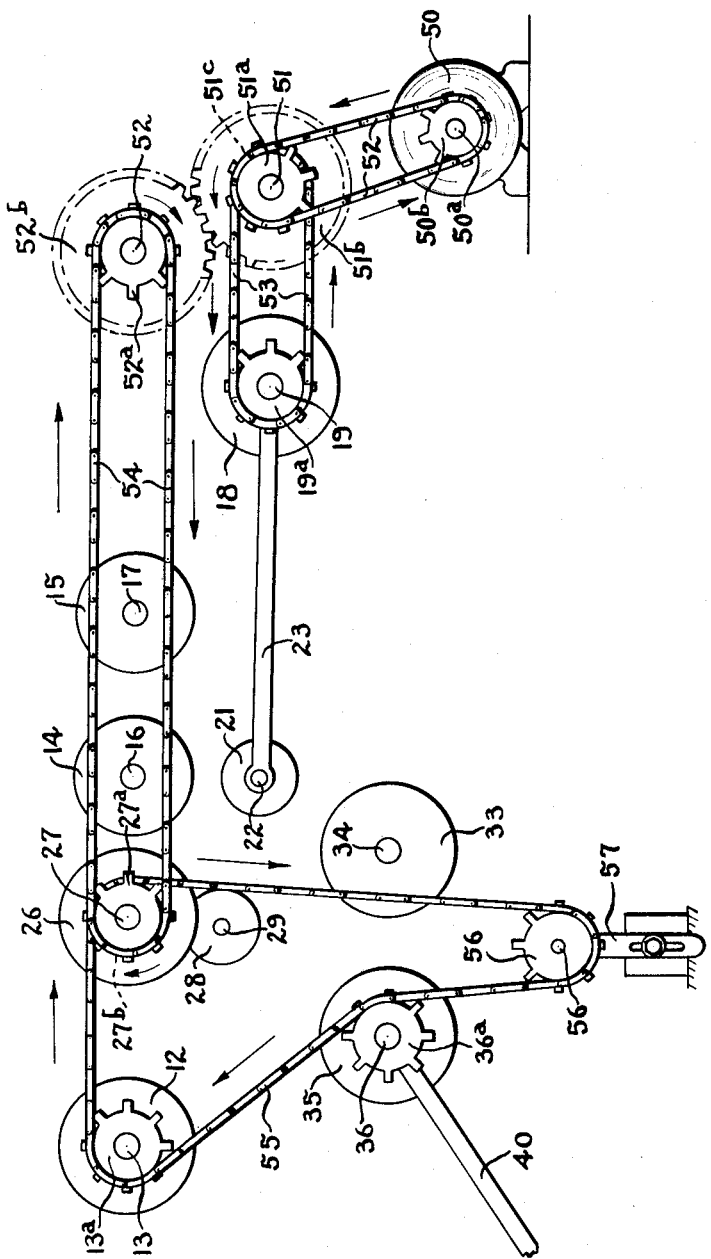
Fig. 3 is a view similar to Fig. 1, but showing the driving connections for certain of the mechanism.

Referring to Fig. 1, it shows a conveyor section comprising upper wire belts 10 and lower wire belts 11. Belts 10 travel around a driven grooved roller 12 fixed on a shaft 13 and bear on the lower side of grooved idle rollers 14 and 15 carried on shafts 16 and 17, respectively. The belts 11 travel around a driven grooved roller 18 fixed on a shaft 19. Belts 20, which form extensions of the belts 11, travel around the roller 18 and on a grooved idler roller 21 fixed to a shaft 22 which is journaled in the ends of members 23. Members 23 are pivotally supported at their other ends on the shaft 19, and said arms are biased upwardly by compression springs 24 to urge roller 21 into contact with roller 14.

A set of wire belts 25, which generally run at an oblique angle to the belts 10, and form extensions of the latter, travel around a driven grooved roller 26 fixed on a shaft 27, a grooved idler roller 28, rotatable on a shaft 29, and around a grooved idler roller 30 rotatable on a shaft 31. Wire belts 32, disposed for travel in a parallel relation to the belts 10, travel around a grooved idler roller 33 rotatable on a shaft 34 and around a driven grooved roller 35 fixed on a shaft 36. Belts 37, which form extensions of the belts 32, travel around the roller 35 and around a grooved idler roller 38 mounted on a shaft 39 journaled in the ends of members 40, which are pivotally supported at their other ends on the shaft 36. Springs 41 urge the arms 40 upwardly, and consequently the roller 38, into engagement with roller 30.

As shown in Figs. 1 and 2, a light beam 42, emanating from a light source 43, is disposed transversely across the paths of travel of the aforedescribed belts and impinges on a photoelectric cell 44 mounted in line with the source 43.

Fig. 3 shows the driving connections affording drive of the driven rollers and belts hereinbefore described. Driving power is depicted as being provided by a motor 50. Motor 50 drives a shaft 51 of a section joint through the medium of sprocket 50$^b$ and 51$^a$ fixed on the shaft 50$^a$ of motor 50 and shaft 51, respectively and a roller chain 52 drivingly meshing with such sprockets. A gear 51$^b$ fixed to shaft 51 meshes with a similar gear 52$^b$ fixed on a second shaft 52 of the section joint to afford reverse rotation of the latter shaft. Shaft 51 has a second sprocket 51$^c$ fixed thereon and the latter drives a roller chain 53 which also drivingly meshes with a sprocket 19$^a$ fixed on shaft 19 to afford drive of belts 11 and 20 in the direction indicated in Fig. 1. A sprocket 52$^a$ fixed on shaft 52 drives a roller chain 54 which drivingly meshes with a sprocket 27$^a$ fixed on shaft 27 to afford drive of the latter in the clockwise direction. Shaft 27 has a second sprocket 27$^b$ fixed thereon which drives a roller chain 55. Chain 55 drivingly meshes with a sprocket 13$^a$ fixed on shaft 13, a sprocket 36$^a$ fixed on shaft 36, and with an idler sprocket 56$^a$ rotatable on a shaft 56 which is journaled on an adjustable member 57. The drive of sprockets 13$^a$ and 36$^a$ by chain 55 affords drive of belts 10, 25, 32 and 37 in the respective directions shown in Fig. 1. As will be appreciated the adjustment of member 57 determines the tension maintained in chain 55.

The operation of the counting system mechanism will now be described.

Let it be assumed that motor 50 is energized, the drive system is driving the various belts in the direction shown in Fig. 1, and that a stream of overlapped, folded flexible articles, such as newspapers or the like, with folded edges leading and in direct delivery relation, i. e. each following paper being lapped on top of its immediately preceding paper, are being carried between the upper belts 10 and the lower belts 11 and 20. As each article, such as that designated U, advances between rollers 14 and 21, its leading portion is carried outwardly to the left of the last mentioned rollers into abutting engagement with belts 25 until it is brought into engagement along its folded edge against the belts 25. Belts 25 at this point are traveling downwardly at an oblique angle with respect to belts 10 and 20 and thus pull the folded edge of the article U quickly downwardly. The leading portion of article U, between its folded edge and the point O on the line between the centers of shafts 16 and 22, is accordingly flipped downwardly through light beam 42 so as to lie in lapped relation again on the next preceding article, such as that designated W. The trailing portion of article U, when it passes out beyond the left of rollers, will drop down onto the belts 32, as depicted by the trailing portion of the article designated X, next preceding article W. By the time such trailing portion of an article drops onto the belts 32 its leading portion has passed between the belts 25 and 37 and the latter grip the same for transport therebetween to rollers 30 and 38.

As will be understood, the flipping of each article downwardly through light beam 42 causes a momentary interruption of the latter, which results in corresponding momentary changes in the potential generated by photoelectric device 44. Each such momentary change in potential can be made to effect a registration in any suitable electrically responsive countermechanism to effect, either a totalization of the articles in a run, or to afford a control function after a predetermined number of said articles have been flipped through the light beam. The aforementioned Howdle and Otto application disclose a counter mechanism actuatable by such a photo-electric device for controlling a stacking machine, and the present system is ideally suited for such service.

While the operation has been described in connection with an overlapped stream of articles, this system is suitable for counting similar articles that are conveyed in spaced apart (unlapped) relation as well. Certain latitude is permitted in the relationship of the various belts, the positioning of the light beam, and relationship of certain disclosure to lap lead, etc., but I have found for obtaining optimum accuracy in counting that the following factors and preferred relationships should be carefully considered, or closely adhered to, as the case may be.

(a) The distance A between point O, the contact point of roller 14 with roller 21, and the point L, the point of intersection of the paths of belts 10 and 25, should be equal to and preferably slightly less than the normal lap-lead obtaining when articles are conveyed in a lapped stream. Lap-lead meaning the distance between the leading edge of one article and the corresponding edge of the next following article.

(b) The distance B between points O and M must be less than the length of minimum length articles to be counted. In an embodiment constructed in accordance with the invention, it was found preferable to make such distance B approximately 85% of the length of the articles normally handled.

(c) Since the folded edge of newspapers and the like vary with the number of pages and degree of the fold, the light beam 42 must be spaced away from the short portion of belts 25 running between roller 26 and 28, approximately ¼" to ½", and such light beam must be spaced below belts 10 not less than the maximum thickness of the articles to be handled.

(d) The diameter of the light beam should be small to reduce the possibility of over-counts when handling thick folded articles having loose folds.

(e) The points M, N, and O should lie along a straight line to provide a line of travel for single, spaced apart articles which is smooth, and which markedly reduces any tendancy of the trailing portions of such articles being flipped upwardly throught the light beam and thereby effecting over-counts.

(f) The angle $\alpha$, included between belts 10 and the short portion of the belts 25 running between rollers 26 and 28, should never be less than 90° and for optimum results should be on the order of 120°. If angle is made too small, there is a tendency for S-shaped buckling to occur in the leading portion of the article, following butting of leading edge against the belts 25, and such may result in over-counts. On the other hand, if angle $\alpha$ is made too large, no portion of the articles may be flipped through the light beam thereby resulting in under-counts.

(g) The angle $\beta$, included between the extension of the straight line running through points M, N and O and in belts 10, is so set that when single, spaced apart articles are conveyed the trailing cut edge portions thereof do not flip up to interrupt light beam 42. If angle $\beta$ is too large, the papers tend to be directed abruptly to the belts 32, which may cause buckling of papers resulting in over-counts if single, spaced apart articles are being conveyed, or in under-counts if the articles are conveyed in lapped relation.

While in the form hereinbefore described and disclosed, rollers were preferably used for carrying all the belts associated with a shaft, it will be understood that individual pulleys can be used if preferred. In the appended claims the use of the term "pulley" or "pulleys" will be understood to cover an equivalent roller portion or roller as the case may be.

I claim:

1. In a system for conveying and counting substantially flat, flexible articles, a conveyor of the belt and pulley type comprising first belts, second belts forming extensions of said first belts having a working section which intersects the path of travel of said first belts and travel downwardly at an oblique angle therefrom, third belts cooperating with said first belts for gripping articles therebetween, end pulleys for said third belts biased for movement toward said first belts and being spaced apart upstream from said working portion of said second belts, a light source disposed to project a light beam across the paths of belt travel in the space between said first belts, said working portion of said second belts and said end pulleys, a light sensitive device disposed to have said light beam normally impinge thereon, and means for driving the belts of said conveyor for conveyance of articles and to effect flipping of the leading portion of each article through said light beam for interruption of the latter as an incident to the abutment of the leading edge of such article against said working portion of said second belts.

2. The combination according to claim 1 wherein said first belts have idler pulleys in line with said end pulleys of said third belts to provide for pinching of articles therebetween to facilitate the flipping of their leading portions through said light beam.

3. The combination according to claim 2 together with fourth belts having a working portion parallel with said first belts and disposed below the latter and said third belts, fifth belts forming extensions of said fourth belts and cooperating with a second working portion of said second belts to grip articles therebetween, end pulleys for said second and fifth belts, and means biasing the last mentioned end pulleys toward each other.

4. The combination according to claim 3 wherein said light beam path is disposed below the working portion of said first belts a distance not less than the maximum thickness of the articles to be handled.

5. The combination according to claim 3 wherein the oblique angle between said first and second belts is substantially 120° and said light beam path is disposed upstream from said one working portion of said second belts not less than one-quarter of an inch.

References Cited in the file of this patent

UNITED STATES PATENTS

| | | |
|---|---|---|
| 978,702 | Cowles | Dec. 13, 1910 |
| 1,557,944 | Reisbach | Oct. 20, 1925 |
| 2,233,850 | Rapley | Mar. 4, 1941 |
| 2,628,704 | Colvin | Feb. 17, 1953 |